(12) United States Patent
Mack

(10) Patent No.: US 6,997,208 B2
(45) Date of Patent: Feb. 14, 2006

(54) VALVE SUITABLE FOR USE IN AN OIL CIRCUIT OF AN INTERNAL COMBUSTION ENGINE

(75) Inventor: Klaus Mack, Hardthausen (DE)

(73) Assignee: Mann & Hummel GmbH, Ludwigsburg (DE)

( * ) Notice: Subject to any disclaimer, the term of this patent is extended or adjusted under 35 U.S.C. 154(b) by 1 day.

(21) Appl. No.: 10/663,996

(22) Filed: Sep. 17, 2003

(65) Prior Publication Data

US 2004/0112429 A1 Jun. 17, 2004

(30) Foreign Application Priority Data

Sep. 18, 2002 (DE) .......................................... 102 43 291

(51) Int. Cl.
*E03B 3/18* (2006.01)

(52) U.S. Cl. ................. 137/549; 137/543.15; 123/196 R
(58) Field of Classification Search ............ 137/543.15, 137/549; 123/196 R
See application file for complete search history.

(56) References Cited

U.S. PATENT DOCUMENTS

| 603,243 A | * | 5/1898 | Albrecht, Jr. ................ 137/549 |
| 1,828,697 A | * | 10/1931 | Yardley .................. 137/543.13 |
| 2,016,278 A | * | 10/1935 | Ehlers ...................... 137/493.6 |
| 3,235,085 A | * | 2/1966 | Humbert, Jr. ................ 210/130 |
| 3,523,807 A | * | 8/1970 | Mihaly .................. 106/156.31 |
| 5,323,807 A | * | 6/1994 | Gauld et al. ........... 137/543.15 |
| 6,019,128 A | * | 2/2000 | Reiter ......................... 137/549 |

FOREIGN PATENT DOCUMENTS

DE        20006974 U1    9/2001

* cited by examiner

*Primary Examiner*—A. Michael Chambers
(74) *Attorney, Agent, or Firm*—Crowell & Moring LLP

(57) ABSTRACT

A valve, in particular for the oil circuit of an internal combustion engine. The valve includes a supporting dome, a valve body situated therein, a valve disk which is connected to the supporting dome and has an opening which can be closed by the valve body, and an element having a spring action which urges the valve body into the position in which the valve body closes the opening of the valve disk; the valve disk including a receptacle for a screen element, and the screen element being permanently connected to the valve disk.

11 Claims, 2 Drawing Sheets

VALVE SUITABLE FOR USE IN AN OIL CIRCUIT OF AN INTERNAL COMBUSTION ENGINE

BACKGROUND OF THE INVENTION

This invention relates to a valve, in particular for the oil circuit of an internal combustion engine.

A valve of this general type disposed in a liquid filter is already known from German Utility Model No. DE 200 06 974 U1. The disclosed liquid filter has a replaceable filter insert and a supporting dome which supports the filter insert. A filter bypass valve is arranged in the supporting dome, where a valve body of the filter bypass valve cooperates with a sealing surface formed by an end disk of the filter insert. The valve body closes an opening, which is essentially in a stationary arrangement during filter operation, but can be removed from the valve body. A screen provided on the valve insert is connected upstream from the opening in the sealing surface. The screen functions to capture particles of dirt during the open states of the filter bypass valve. The screen comprises, for example, a pot-shaped or hood-shaped element or a screen disk. The disadvantage of such an element is that a relatively large amount of space must be available in order for the quantity of oil passing through the screen not to suffer an excessive pressure drop. Furthermore, there is a risk of the screen being deformed due to the high pressure of the oil, especially when the screen surface is soiled.

SUMMARY OF THE INVENTION

It is an object of the present invention to provide an improved valve for a filter element which avoids the disadvantages described above.

Another object of the present invention is to provide a valve for an oil filter system which will function reliably and will not lose its effect even at high oil pressures.

A further object is to provide a valve for a liquid filter which can be used as a back-flow check valve or as an excess pressure bypass valve for an oil filter.

A particular object of the invention is to provide a valve for an oil filter system which is suitable in particular for the oil circuit of an internal combustion engine.

These and other objects are achieved in accordance with the present invention by providing a valve comprising a supporting dome, a valve body situated in said dome, a valve disk which is connected to the supporting dome and has an opening which can be closed by the valve body, and an element having a spring action which urges the valve body toward a position in which the valve body closes the opening of the valve disk, wherein the valve disk has a receptacle for a screen element, and the screen element is permanently connected to the valve disk.

An important aspect of the inventive valve is that the valve disk has a receptacle for a screen element, and the screen element is permanently connected to the valve disk. This may be accomplished, for example, by embedding the screen element in the valve disk.

According to a further embodiment of this invention, the supporting dome and valve disk are connected to each other by a clamping element. This clamping element may, for example, comprise a flange ring with which the two parts can be flanged together. This flange ring may additionally serve to mount the valve in an opening. The mounting may be accomplished, for example, by an outside thread on the clamping element. There is also the possibility of gluing or press-fitting the clamping element into an opening.

According to another embodiment, the valve disk is equipped with a hood, and this hood may contain the screen element. The screen element is fixedly anchored, clamped or press-fit in or into this hood. The hood also protects the screen element from mechanical damage.

In another embodiment of this invention, the screen element is made of sintered or foamed plastic and/or a non-woven material, which has a high deep filtration effect and can easily be integrated into the valve hood. There is also the possibility of using a woven screen. Dirt particles are retained as they flow through the screen element and therefore cannot interfere with the functioning of the valve.

If the valve is used to prevent backflow, the opening pressure of the valve will be in the range of 0.1 to 0.4 bar. However, if the valve is used as a bypass valve, the opening pressure is selected to be higher accordingly.

In one advantageous embodiment, the liquid throughput through the valve amounts to 0.5 to 5 liters per minute. Here again, there is the possibility of adjusting the liquid throughput through appropriate dimensioning of the valve.

To guide the valve body, the supporting dome is equipped with a guide pin. The guide pin projects inward in the direction of the valve body. The valve body, in turn, has a corresponding recess or aperture in which the pin is received, and thus the valve body is reliably guided inside the valve.

In one preferred embodiment, the supporting dome as well as the valve body and the valve disk are made of synthetic resin material (i.e., plastic). The use of polyamide [nylon] 66-GF35 as a material for the valve body and valve disk has been found to be especially advantageous for such a valve.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawing figures in which.

DETAILED DESCRIPTION OF PREFERRED EMBODIMENTS

Figure 1:
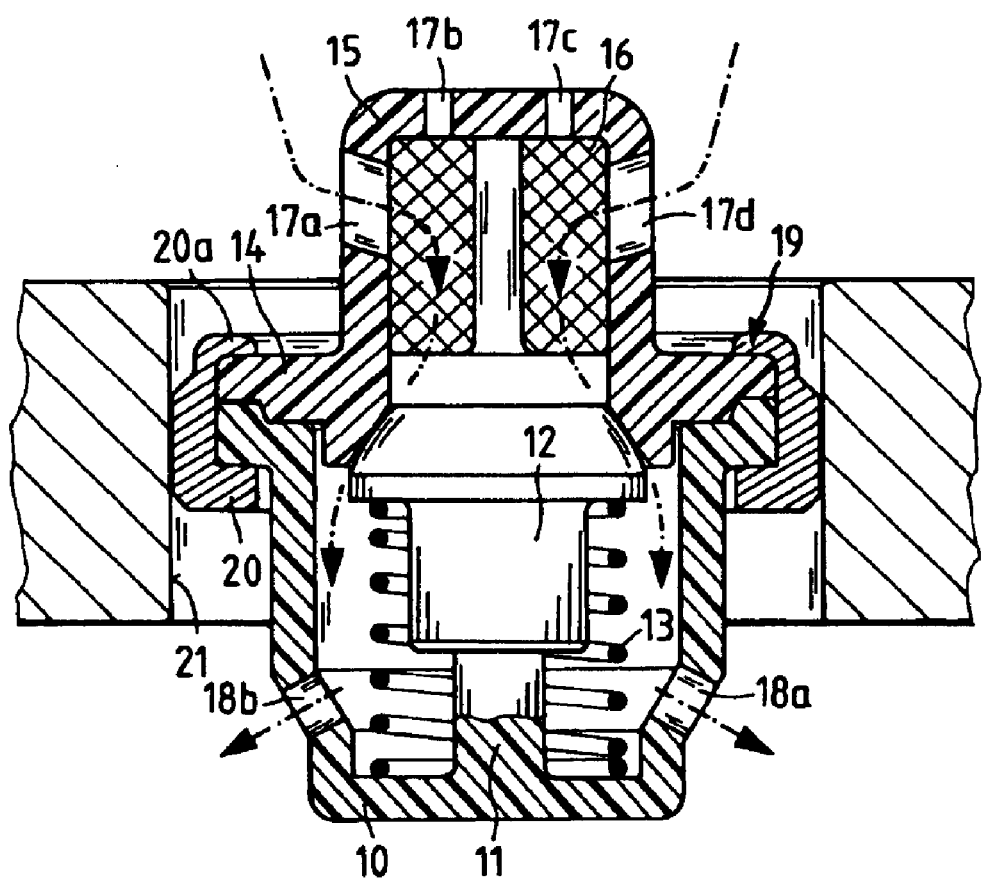
FIG. 1 is a sectional diagrammatic view of a valve for the oil circuit of an internal combustion engine.

The valve according to FIG. 1 comprises a supporting dome 10, which is equipped with a guide pin 11. A valve body 12 engages over the guide pin 11 and is pushed by a compression spring 13 against the valve seat of a valve disk 14. The valve disk 14 is provided with a hood 15 in its central area. Within this hood 15 is a screen element 16. The valve disk 14 with the hood 15 and the screen element 16 are all made of synthetic resin material. This makes it readily possible to embed the screen element 16 in the hood 15 during its manufacture. For example, the screen element 16 may be embedded in the plastic of the hood 15 by extrusion. The oil flows through the screen element, which retains particles of dirt as the oil flows through.

In another variant, the hood 15 has openings 17*a*, 17*b*, 17*c*, 17*d* which serve to allow admission of the oil flowing through the valve. For example, the valve has an opening pressure in the range of 0.1 to 0.4 bar. The inflowing oil opens the valve, i.e., the valve body 12 moves downward against the spring pressure. The oil can flow through the valve and leaves the device through the openings 18*a*, 18*b*. The entire valve is embedded in a borehole. The edge area of the borehole is indicated only schematically. The path of the oil flow is indicated by the arrows shown in the figure.

The supporting dome 10 is connected to the valve disk 14 in a ring-shaped outer area 19. If these two parts are made of a thermoplastic synthetic resin material, it is possible to join them together by friction welding. In the embodiment shown in FIG. 1, an annular aluminum clamping ring 20 is provided, surrounding the two parts and producing a reliable connection of the two parts due to a flange edge 20*a*. In addition, the aluminum ring 20 may be pressed, glued or screwed into the borehole 21 shown here.

Figure 2:
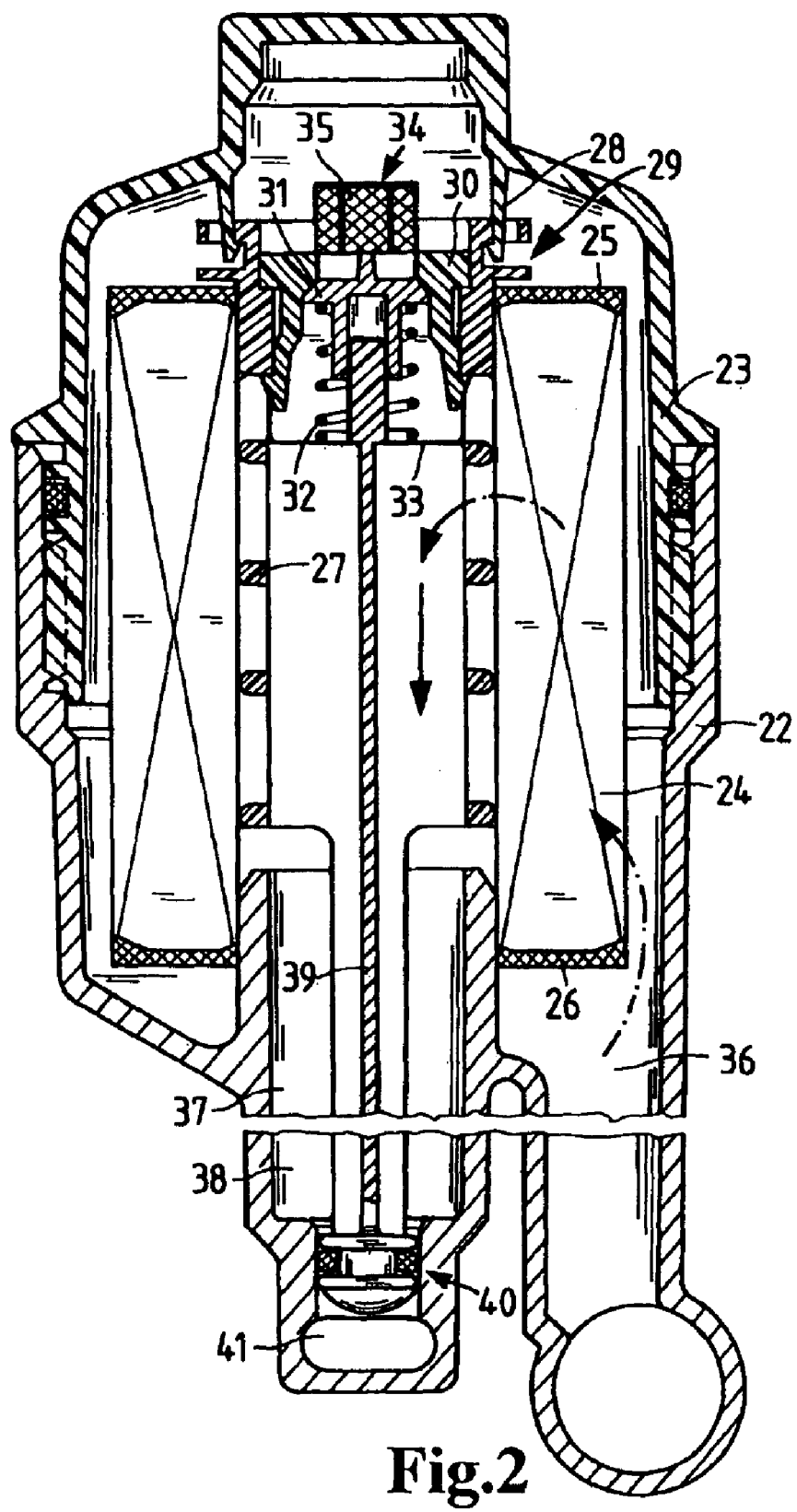
FIG. 2 is a sectional diagram of an oil filter system for an internal combustion engine incorporating a filter with a bypass valve according to the invention.

FIG. 2 shows an oil filter system for an internal combustion engine comprising a housing 22, a cover 23 which covers the open end of the housing 22 and is secured to the housing by a threaded connection, and a filter element 24 situated in the housing. The filter element 24 is made of filter paper folded in a zigzag pattern and arranged between end disks 25 and 26.

The filter element 24 is held by a supporting tube 27. The supporting tube is fastened to the cover 23 by snap connections 28. In the upper area of the supporting tube there is a filter bypass valve 29 comprised of a valve disk 30 which is snapped into the supporting tube 27, and a valve body 31 which is acted upon by a compression spring 32. The compression spring is supported on a supporting surface 33 of the supporting tube 27.

A supporting dome 34 is provided above the valve disk. This supporting dome is rigidly connected to the valve disk 30 and has a screen body 35 in its interior. The liquid to be purified flows through the channel 36 into the area of the housing, flows through the filter element 24 and through channel 37 in the central area to the outlet opening 38.

The supporting tube 27 has a closure element 40 which is connected via a guide rod 39, and which closes an outlet channel 41 which leads directly to the oil pan of the internal combustion engine. When the oil filter is opened, the cover 23 is moved upward, carrying with it the guide pin 39 and closure element 40, thereby releasing the opening, i.e., the outlet channel 41, so that the oil in the filter system can then flow out through outlet channel 41.

The filter bypass valve 29 with the screen effectively retains particles of dirt, which otherwise might be able to enter the clean liquid area during a bypass of the filter. Particles that are small enough to pass through the screen are not harmful for operation of the machine unit in question and cannot result in, for example, clogging of extremely small oil bores and thereby endangering the lubricant supply to certain lubrication points.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A valve comprising a supporting dome, a valve body situated in said dome, a valve disk which is connected to the supporting dome and has an opening which can be closed by the valve body, and an element having a spring action which urges the valve body toward a position in which the valve body closes the opening of the valve disk, wherein the valve disk is equipped with a receptacle in the form of a hood for a screen element, and the screen element is encased within said hood and permanently connected to the valve disk.

2. A valve according to claim 1, wherein the supporting dome and the valve disk have common contact surfaces and are connected by a clamp element, and wherein said clamp element also fastens the valve in an opening.

3. A valve according to claim 1, wherein the screen element is composed of sintered or foamed synthetic resin material.

4. A valve according to claim 1, wherein the screen element is made of a synthetic resin material.

5. A valve according to claim 4, wherein the synthetic resin material is a polyamide or a polyester material.

6. A valve according to claim 1, wherein the valve has an opening pressure in the range from 0.1 to 0.4 bar.

7. A valve according to claim 1, wherein said valve has a liquid throughput in the range from 0.5 to 5 liters per minute.

8. A valve according to claim 1, wherein the supporting dome is equipped with a guide pin, and the valve body moves on this guide pin.

9. A valve according to claim 1, wherein the supporting dome, the valve body and the valve disk are made of synthetic resin material.

10. A valve according to claim 8, wherein the synthetic resin material is a nylon polyamide.

11. A valve according to claim 1, wherein the valve is arranged in a lubricating oil circuit of an internal combustion engine.

* * * * *